US006265013B1

(12) United States Patent
Martinez-Montes et al.

(10) Patent No.: US 6,265,013 B1
(45) Date of Patent: Jul. 24, 2001

(54) SELECTIVE NIXTAMALIZATION PROCESS FOR THE PRODUCTION OF FRESH WHOLE CORN MASA, NIXTAMALIZED CORN FLOUR AND DERIVED PRODUCTS

(75) Inventors: Jose De La Luz Martinez-Montes, Puebla; Feliciano Sanchez-Sinencio, Naucalpan; Maximiano Ruiz-Torres, Michoacan; Fernando Martinez-Bustos, Veracruz, all of (MX)

(73) Assignee: Instituto Politecnico Nacional, Zacatenco (MX)

( * ) Notice: Subject to any disclaimer, the term of this patent is extended or adjusted under 35 U.S.C. 154(b) by 0 days.

(21) Appl. No.: 09/537,013

(22) Filed: Mar. 28, 2000

(51) Int. Cl.$^7$ ..................................................... A23L 1/00
(52) U.S. Cl. ........................ 426/622; 426/463; 426/507; 426/626
(58) Field of Search .................................... 426/523, 507, 426/509, 463, 464, 481, 518, 622, 626

(56) References Cited

U.S. PATENT DOCUMENTS

| | | | |
|---|---|---|---|
| 2,584,893 | 2/1952 | Lloyd | 99/93 |
| 2,704,257 | 3/1955 | Diez de Sollano et al. | 99/93 |
| 3,194,664 | 7/1965 | Eytinge | 99/80 |
| 3,404,986 | 10/1968 | Wimmer et al. | 99/93 |
| 3,730,732 | 5/1973 | Rubio | 99/80 |
| 4,513,018 | 4/1985 | Rubio | 426/622 |
| 4,594,260 | * 6/1986 | Vaqueiro et al. | 426/626 |
| 4,710,386 | * 12/1987 | Fulger et al. | 426/518 |
| 5,176,931 | * 1/1993 | Herbster | 426/464 |

FOREIGN PATENT DOCUMENTS 125285   4/1972   (MX) .

OTHER PUBLICATIONS

Montemayor, E. and Rubio, M., "Alkaline Cooked Corn Flour: Technology and Uses in Tortilla and Snack Products," (Abstract) *Cereal Foods World* 28: 577.

Molina, M.R., Letona, M. and Bressani, "Drum Drying Technology for the Improved Production of Instant Torilla Flour", *J. Food Science* 42: 1432–1434 (1977).

Vivas, N.E., Waniska, R.D., and Rooney, L.W., "Effect of Tortilla Production on Protein in Sorghum and Maize", *Cereal Chemistry* 64: 384–389, (1987).

Bressani, R. Paz y Paz, and Scrimshaw, N.S. "Corn Nutrient Losses. Chemical Changes in Corn During Preparation of Tortillas", *J. Agric. Food Chem* 6: 770–773, (1958).

Paredes–Lopez, O., and Saharopulos, M.E., "Scanning Electronmicroscopy Studies of Limed Corn Kernels for Tortilla Making", *J. Food Technology*, 17: 687–693, 1982.

Rooney, L.W., and Serna–Saldivar, S.O., "Food Uses of Whole Corn and Dry–Milled Fractions", *Corn Chemistry and Technology*, pp. 399–429, 1987.

Gomez, M.H., Mcdonough, C.M., Rooney, L.W., and Waniska, R.D., "Changes in Corn and Sorghum During Nixtamalization and Tortilla Baking", *J. Food Science*, 54: 330–336, 1989.

Sugawara, Suzuki, Tosuka, Takeuchi, Ueki, "Composition of Corn Hull Dietary Fiber", *Starch* 46: 335–337 (1994).

Gomez, "Dry Corn Masa Flours for Tortilla and Snack Box", *Cereal Foods World*, 32: 372–377, 1987.

Robles, R.R., Murray E.D., and Paredes–Lopez, O., "Physicochemical Changes of Maize Starch During the Lime-–Treatment for Tortilla Making", *Int. J. of Food Science and Technology*, 23:91–98, 1988.

Gomez, M.H., Lee, J.K. Mcdonough, Waniska, and Rooney L.W., "Corn Starch Changes During Tortilla and Tortilla Chip Processing", *Cereal Chem*, 69, 275–279, (1992).

Gomez, Waniska, and Rooney, "Effects of Nixtamalization and Grinding Conditions on Starch in Masa", *Starch*: 42: 475,482, (1990).

* cited by examiner

*Primary Examiner*—George C. Yeung
(74) *Attorney, Agent, or Firm*—Abelman, Frayne & Schwab

(57) ABSTRACT

A process for the production of fresh masa, nixtamalized flour and derived produts is disclosed. Water-lime cooking of pericarp fractions of the corn, and appropriate hydration of the germ and endosperm fractions of the corn is achieved to prepare fresh masa, nixtamalized corn flour and derived products. The pericarp fractions are cooked with lime and water at a temperature between about 50° C. to about 300° C. The germ and endosperm fractions are hydrated with water. The pericarp fractions and the germ-endosperm fractions are milled separately, and the milled pericarp, germ and endosperm fractions are then mixed for producing fresh corn masa. The fresh corn masa can be dehydrated and milled for producing nixtamalizaed corn flour. Also, the pericarp, germ and endosperm fractions can be dried in order to produce nixtamalized corn flour.

35 Claims, No Drawings

SELECTIVE NIXTAMALIZATION PROCESS FOR THE PRODUCTION OF FRESH WHOLE CORN MASA, NIXTAMALIZED CORN FLOUR AND DERIVED PRODUCTS

FIELD OF THE INVENTION

The present invention refers to a process for the preparation of nixtamalized whole corn for the preparation of tortillas, nixtamalized corn flour and corn and tortilla chips. Fractions pericarp, germ, and endosperm of any genotype of corn, lime or a substitute, and water are used as starting materials.

BACKGROUND TO THE INVENTION

Corn was the principal source of food for the pre-Columbian civilizations of the New World. Today corn tortillas and derivative products are still the staple food of Mexico and Central America. Also, corn tortilla, corn chips, and tortilla chips have widely penetrated the market of the United States and some countries of Asia and Europe. The tortilla industry represents one fifth of the global food market in Mexico. The nixtamalization process involves alkaline cooking, steeping, washing, and stone-grinding of the cooked grains to produce masa. Corn masa is kneaded and molded, then baked on a hot griddle to produce table tortillas, which can be fried for tortilla chips and taco shells. Fresh masa can be kneaded, molded, cut, and fried for corn chips, or dried to produce nixtamalized corn flour. In Mexico, approximately 70% of the total corn production is consumed in the form of tortillas. Among the low income population, tortilla is the main source of calories and proteins.

The traditional method to process corn into tortillas (nixtamalization) goes back to early Mesoamerican civilizations, and the basic steps of the process have remained basically unaltered since. The traditional process, whole corn is cooked in a boiling water-lime (or water-ash) solution for a short time (5–45 min) and stepped in this solution, as it cools, for a period of 12 to 18 hours. The cooking liquor, called nejayote, is discarded; with it is lost the fraction of the pericarp and germ dissolved in the nejayote. The cooked, steeped, and drained corn grains (nixtamal) are washed to remove excess lime; here again, a part of pericarp and germ material is lost; the total corn fraction lost varies from 7 to 15%. The nixtamal is ground with a pestle and stone into masa. Finally, the masa is flattened into thin disks that are cooked on a hot griddle for 30–60 seconds on each side to produce tortillas. Tortillas prepared by the traditional method just described generally show excellent rheological characteristics, such as puffing and elastic strength.

Masa for tortilla can also be obtained by hydration of instant flour, which in turn is made from drying fresh masa. Although the quality of tortilla made from instant flour is inferior to that made from fresh masa, the industrial production of nixtamalized corn flour has become popular among the small and large tortilla producers because of its advantages insofar as distribution and storage are concerned.

However the quality of tortillas made from instant flour is usually poorer than the quality of tortillas made with the traditional method. Diverse methods for making tortillas are shown in the U.S. Pat. No. 2,584,893, issued to W. R. Lloyd and R. Millares-Sotres, February 1952; and U.S. Pat. No. 2,704,257 issued to Sollano and Berriozabal, March, 1955.

Prior efforts have been directed towards the improvement of the stability of the end products, the reduction of cooking time, the reduction of losses of alkali-soluble substances, and to improve the quality of the final product to a level set by the traditional method (U.S. Pat. No. 2,704,257, issued to C. S. F. Diez de Sollano, and J. M. Berriozabal on Mar. 15, 1955.

Although this method represents an improvement over the traditional nixtamalization process, it requires the use of very costly equipment that is difficult to control.

Manuel Jesus Rubio in his U.S. Pat. No. 3,730,732, reported an increase in the yield of masa by incorporating water alkaline soluble substances. Also, Rubio reported that adding alkali soluble substances to masa retards spoilage of tortillas. However, the tortillas tend to become hard and brittle.

E. L. Wimmer et al in their U.S. Pat. No. 3,404,986, issued on Oct. 8, 1968, reported a method of manufacturing a corn flour with a rich whole corn flavor, different from flour obtained by lime treatment. This patent teaches how to partially gelatinize a previously prepared corn meal with a closely adjusted heated rotating rolls. The resulting flakes are thereafter ground to obtain corn flour. The instant flour obtained by this process can be used for fried snacks but not for the manufacture of tortillas.

Mexican patent No. 125,285, issued to Celorio on Apr. 25, 1972, describes a different process and apparatus for the preparation of nixtamalized corn flour by using a dry process in which a previously prepared corn meal with an appropriate amount of lime is heated in a chamber. However, it may be regarded as producing poor results in view of the fact that mixing of the corn meal and the lime in a powdered state, produces inhomogeneities in the nixtamalization process, with the consequent difficulties in quality control of the corn flour obtained by said process.

U.S. Pat. No. 4,513,018 issued to Rubio, M. J. on Apr. 23, 1985, discloses a continuous method for producing corn flour suitable for making tortillas, taco shells, tortilla chips and the like, which uses a modified nixtamalization process which includes the precooking of corn grains in the presence of lime within a vessel provided with a screw conveyor, although the main problems of the traditional method remain.

Special attention should be given to in U.S. Pat. No. 4,594,260 issued to M. C. Vaqueiro, and P. Reyes on Jun. 10, 1986,. This patent teaches a technology wherein, the hull is removed from the germ and endosperm of the corn kernel, nixtamalized by the traditional method, and then re-mixed with the non nixtamalized endosperm and germ fractions. This method, although more efficient than the traditional method in view of the fact that only a small fraction of the corn kernel has to be nixtamalized, produces contaminated effluents, involves longer processing times and requires rather elaborate equipment to separate the hull fraction. Also the hull must be free of endosperm fractions in order to produce a good quality of masa for instant flour preparation.

Other methods of instant flour production have been proposed by Montemayor and Rubio in the paper "Alkaline cooked corn flour: Technology and uses in tortilla and snack products, Cereal Foods World 28:577, 1983, and in Molina, M. R., Letona, M. And Bressani, R. 1977, Drum drying technology for the improved production of instant tortilla flour, J. Food Sci. 42:1432–1434.

Some of these processes involve grinding the whole corn grain and to the over-gelanitization of the starch granules are exposed or low hydrolysis of the pericarp could ocurr, resulting in a masa of poor quality. The cooker-extruders function as a continuous cooking process in which starch gelatinization and puffing of the extrudate are avoided (Serna-Saldivar, S. O., Gomez, M. H., and Rooney, L. W. 1990. Technology, chemistry and nutritional value of alkaline-cooked corn products. Chapter 4. In: Advances in Cereal Science and Technology. Vol. X., Y. Pomeranz (ed) p. 243–307. American Association of Cereal Chemists. St. Paul, Minn.)

Unfortunately, none of these methods provide an integral solution to the tortilla industry. They either solve all problems to an adequate level but use complicated and expensive processes, or they retain the drawback of the traditional process. Our process is simple and inexpensive and addresses all the problems found in the tortilla production.

Many efforts have been expanded on for a better understanding of the nixtamalization process. However, these studies have been focused only on the changes that take place in the protein, starch, and lipids components, without considering the importance of the outer layers of the grain (pericarp fraction). The process of the present invention shows the importance of the pericarp fraction and how it can be treated efficiently for preparing fresh masa and nixtamalized corn flour for the preparation of tortillas and derived products.

The importance of the starch during the nixtamalization process has been summarized by Gomez, in the paper "Physicochemical characteristics of fresh masa from alkaline process corn and sorghum and corn dry masa flour. Ph D. dissertation, Texas A&M University, College Station. 105 pp. 1988". This author reported that although the starch granules of the corn grain are severely restricted by the protein matrix and cell walls, they absorb water and swell during cooking and steeping. The susceptibility of the starch to hydrolysis by glucoamylases increases as corn is lime-cooked.

Ortega, E. L., Villegas, E., and Vasal, S. K. 1986 (A comparative study of protein changes in normal and quality protein maize during tortilla making. Cereal Chem. 63:446–451); and Vivas, N. E., Waniska, R. D., and Rooney, L. W. 1987 (Effect of tortilla production on protein in sorghum and maize. Cereal Chem. 64:384–389) found that lime cooking and tortilla baking decrease the salt-water-soluble proteins (albumins and globulin) and alcohol-soluble proteins (prolamins) and increase the amount of unextractable proteins. Also lime cooking alters the molecular weight distribution of the different protein fractions, as seen in electrophoretic patterns, where the loss of several protein bands and reduced intensity of other bands were observed (see Gomez, M. H. 1988. Physicochemical characteristics of fresh masa from alkaline process corn and sorghum and corn dry masa flour. Ph D. dissertation, Texas A&M University, College Station. 105 pp.) The role of lipids has been previously reported by Pflugfelder, R. L., 1986. This author cited that 1–2% of the masa dry weight is constituted by free lipids distributed throughout the continuous phase of the masa. The lipid fraction is mainly composed of partially emulsified lipids located in the aqueous phase of the masa and free lipids that interact with both peptides and carbohydrates altering the masa properties. In some instances, high concentrations of lime are used to increase the pH of tortillas to a level at which microbial spoilage is retarded or delayed (see Tellez-Giron, A., Villalba, A., Mcdonough, C., and Rooney, L. W. 1987. The effect of cooking conditions on the quality of table tortillas made from hard and soft corns. (Abstr.) Cereal Foods World 32:658).

Calcium ions are carried by water through the tip cap, germ, and pericarp. Calcium absorption follows a trend similar to that of water absorption but much slower (see Trejo-Gonzalez, A., Feria-Morales, A., and Wild-Altamirano, C. 1982. The role of lime in the alkaline treatment of corn for tortilla preparation. Pages 245–262 in: Modifications of Protein: Food, Nutritional and Pharmacological Aspects. R. E. Feeney and J. R. Whitaker, eds. Adv. Chem. Ser. No. 198. Am. Chem. Soc., Washington, DC; and also Gomez, in the paper "Physicochemical characteristics of fresh masa from alkaline process corn and sorghum and corn dry masa flour. Ph D. dissertation, Texas A&M University, College Station. 105 pp. 1988". Most of the calcium is retained in the germ and pericarp.

Trejo-Gonzalez, A., Feria-Morales, A., and Wild-Altamirano, C. 1982, cited above, indicated that calcium binds to the starch; they found approximately 2.9 times more calcium in starch isolated from lime-cooked kernels than in starch isolated from untreated grains. Also, research studies have shown that during the liming of corn losses of some of the nutrients take place, but what is most interesting is the increase in amino acid availability and in general the noticeable improvement of the overall quality of corn (see Bressani, R., Paz y Paz, and Scrimshaw, N. S. 1958. Corn nutrient losses: Chemical changes in corn during preparation of tortillas. J. Agric. Food Chem. 6:770–773; Cravioto, R. 0. 1945. Nutritive value of the Mexican tortilla. Science 102: 91–93).

Some works cite the structural alterations suffered by the outer layers of the pericarp, but with any relation with the quality of masa and tortillas (rehological properties). Trejo-Gonzalez, A., Feria-Morales, A., and Wild-Altamirano, C. 1982; The role of lime in the alkaline treatment of corn for tortilla preparation. Pages 245–262 in: Modifications of Protein: Food, Nutritional and Pharmacological Aspects. R. E. Feeney and J. R. Whitaker, eds. Adv. Chem. Ser. No. 198. Am. Chem. Soc., Washington, DC. This paper reported that lime acts in a manner similar to stronger alkali (e.g., NaOH) by disrupting fiber components such as hemicellulose.

Paredes-Lopez, O., and Saharopulos, M. E. 1982; "Scanning electron microscopy studies of limed corn kernels for tortilla making"; J. Food Technol. 17:687–693, reported that during the lime treatment of the tortilla making process, the outside surface of the alkali-treated kernels (nixtamal) showed substantial structural alteration, which facilitates its separation. Most of the germ remains attached to the starchy endosperm, and greatly contributes to the nutritional quality of the product. The cell walls of the horny and floury endosperm appeared noticeably affected in the preparation of nixtamal. The functional and nutritional properties acquired by nixtamal might be related to the structural modifications. Also, prior efforts have been directed towards the improvement of the tortilla quality, focusing only on the major parameters that govern tortilla production. These parameters are the physical quality and efficient conditions of storage of corn, ingredients and products; the composition of the corn grain (moisture, starch, amylose-amilopectin ratio, lipids, carbohydrates, pigments, vitamins, minerals and fiber contents); the lime-cooking, steeping, and baking, times and temperatures; the types of mills (size of particle of masa and flour); the moisture content of the corn, nixtamal, masa, tortillas, and derivatives; processing conditions of the equipment and lime concentration used, and sanitation of equipment and personnel.

The above investigations have contributed to a better understanding of the nixtamalization process. However, little, if any attention has been given to the role of pericarp in the quality of masa and tortillas. Some investigations have emphasized the importance of pericarp removal and they have associated this step with better quality of masa and tortilla. The importance of lime treatment has been emphasized to facilitate pericarp removal during cooking and steeping, controlling microbial activity, and affecting the flavor, aroma, color, shelf life, and nutritional value of tortillas (cited in Bressani et al, 1958) (Koetz, R., and Neukom, H. 1977; "Nature of bound nicotinic acid in cereals and its release by thermal and chemical treatment", page 305 in: Physical, Chemical and Biological Changes in Food caused by Thermal Processing. T. Hoyden and 0. Kvale, eds. Applied Science Publishers, London); (Rooney, L. W., and Serna-Saldivar, S. O. 1987. Food uses of whole corn and dry-milled fractions. Pages 399–429 in: Corn: Chemistry and Technology. S. A. Watson and P. E. Ramstad, eds. Am. Assoc. Cereal Chem. St. Paul, Minn. 605 pp.).

Also, a standard method to evaluate pericarp removal has been reported by Serna-Saldivar, S. O., Almeida-Dominguez, H. D., Gomez, M. H., Bockholt, A. J., and Rooney, L. W. 1991. Method to evaluate ease of pericarp removal of lime cooked corn kernels. Crop Sci. 31:842–844.

Alkaline cooking and steeping cause partial dissolution of the cuticle and other pericarp layers (cited in Paredes-Lopez and Saharopulos, 1982) and swelling and weakening of the cell walls and fiber components, which facilitate pericarp removal (cited in Gomez, M. H., Mcdonough, C. M., Rooney, L. W., and Waniska, R. D. 1989. Changes in corn and sorghum during nixtamalization and tortilla baking. J. Food Sci. 54:330–336).

Moreover, other authors cited that alterations in starch crystallinity caused by cooking are partially restored by recrystallization or annealing during steeping. The reassociation of starch molecules may be responsible for the development of the Theological properties of masa. (Gomez 1988).

As reported by some researchers, the lime treatment of the corn causes weakening and hydration of the outer layers. However, not enough is known about the phenomena involved in the role of pericarp in the textural quality of masa and tortilla. One of the most important changes that have not been considered in previous works are the resultant components from lime treatment of the pericarp, referred to as corn fiber gums (cited in Whistler, R. I. 1993. Hemicelluloses. Pages 295–308 in: Indusrial Gums. R. I. Whistler and J. N. BeMiller, eds. Academic Press: New York.).

The alkaline hydrolysis of the hemicellulose fiber (bran) releases fractions of D-xylose, L-arabinose galactose and D-glucuronic acid (see Whistler, R. L. and BeMiller, J. N. 1956. Hydrolisis components from methylated corn fiber gum. J. Am. Chem. Soc. 78: 1163–1165); (Suguawara, M., Susuki, T., Totsuka, A., Takeuchi, M., and Ueki, K. 1994. Composition of corn hull dietary fiber. Starch/Staerke 46:335–337);(Saulnier, L., Marot, C. Chanliaud, E., and Thibault, J. F. 1995. Cell wall polysaccharide interactions in maize bran. Carbohydr. Olym. 26:279–287) which are usually employed as adhesives, thickeners, and stabilizers (see Wolf, M. J., MacMasters, M. M., Cannon, J. A., Rosewell, E. C., and Rist, C. E. 1953. Preparation and some properties of hemicelluloses from corn hulls. Cereal Chem. 30:451–470), and as film formers and emulsifiers (Whistler 1993), which are eventually responsible for the rheological properties of the masa and tortilla.

To partially overcome the problem in the quality of masa and tortilla some industrial producers of instant corn flour use gums as carboxymethyl cellulose, guar, xanthan and Arabic gums to improve keeping properties and functionality in tortillas, helping to counteract the effects of lack of pericarp gums due to shorter steeping times during the cooking of corn grains. The flour producers remove the pericarp that affect the color of the products. However, tortilla manufacturers know that rehydrated dry masa flour has different Theological properties compared to fresh masa. Rehydrated dry masa flour is less plastic and cohesive than fresh masa. Also, the products made from dry masa flour stale faster (Gomez et al 1988). Similarly, the quality of the texture and flavor of tortilla made from instant corn flour is lower than that made from fresh masa (see Gomez, M. H., Rooney, L. W., Waniska, R. D. and Pflugfelder, R. L. 1987. Dry corn masa flours for tortilla and snack production. Cereal Foods World. 32:372–377).

All of these adverse factors of instant corn flour can be attributed to the lack of natural gums presents in the nixtamalized pericarp.

As recorded by other workers, corn cooked in a lime solution absorbs more water than that cooked in water alone (Chang, Y. -H., and Hsu, K. H. 1985. Extent of starch gelatinization during hydrothermal processing of corn for masa production (Abstr.) Cereal Foods World 30:545.470).

Further, the nixtamalization process does not cause extensive gelatinization of the starch. This is supported by differential scanning calorimetric studies. Alkali-cooking and soaking of maize in water (nixtamalization) cause large increases in viscosity, as compared with native flour (Robles, R. R., Murray E. D., and Paredes-Lopez O. 1988. Physicochemical changes of maize starch during the lime-treatment for tortilla making. Int. J. Of Food Sci. And Tech. 23:91–98).

In addition, several granular and molecular forms of starch occur in masa as a result of incomplete gelatinization and retrogradation. Even further, starch solubilization remains unchanged after alkaline cooking and increases after steeping. The physical disruption of the kernel caused by grinding further increases the starch solubilization in masa. Steeping and alkaline cooking produce swelling and agglomeration of starch granules throughout the endosperm. At the same time grinding of nixtamal generates complete physical disruption of kernel. Additionally, starch granules in raw corn exhibit birefringence. The majority of the starch granules in nixtamalized samples are swollen, adhere to other granules, and exhibit partial or total birefringence.

However, the maltese crosses of starch granules are less distinct than those of raw kernels (Gomez, M. H., Lee, J. K., Mcdonough, C. M., Waniska, R. D., and Rooney, L. W., 1992. Corn starch changes during tortilla and tortilla chip processing. Cereal Chem 69; 275–279).

The nixtamalization of corn during dry masa flour production always introduce changes in the organization of starch polymers. The crystallinity of starch in masa is similar to that of raw corn even though the corn is alkaline-cooked, steeped and ground. Microscopic examinations have shown that up to 30% starch birefringence is lost during processing. It is demonstrated also, that nixtamal contains swollen starch granules always restricted by the endosperm cells as that compared to uncooked corn endosperm cells.

After grinding, the endosperm cells are disrupted and the starch granules are released. Most of the starch granules in masa lose their native, regular shape (Gomez, M. H., Waniska, R. D., and Rooney, L. W., 1990. Effects of nixtamalization and grinding conditions on starch in masa. Starch/Starke 42:475–482). Similar processing effects have been observed in fresh masa (Gomez et al 1989).

SUMMARY OF THE INVENTION

The present invention discloses a process for the production of fresh whole corn masa, instant corn flour and the like by means of a selective nixtamalization process. This process minimizes the crucial steps of the traditional method, so that rheological characteristics and general quality of the traditional tortillas are retained, but such that no fraction of the corn grain is lost, no polluting effluents are generated, and no long steeping times are needed.

Also, with the present invention, the hydrolysis and hydration of the pericarp is achieved by subjecting the pericarp to a rapid cooking at high temperatures and separately hydrating the germ-endosperm fraction. Reduction in its steeping time is accomplished with high pressures, which speeds diffusion of water into the internal regions of the grain fractions.

As in the traditional process, starch granules are not damaged because, when grains are cooked, they are fully immersed in water, so water availability is not a limiting factor for starch granule swelling; in addition, granule swelling takes place inside the grain matrix, helping to protect them. The inclusion of the whole pericarp and whole germ enriches the textures and nutritional quality of the final product. The hydrolysis of the pericarp releases gums, conferring appropriate texture to the masa with equal characteristics of those produced by the traditional process.

Water is added in sufficient quantity to appropriately hydrate and hydrolyze the pericarp, so no water is wasted. The combined action of water, lime, temperature, and pressure produce a cooked pericarp with appropriate characteristics to be milled in stone, hammer or disc mills and blended with the hydrated germ-endosperm fractions.

By controlling the cooking parameters (steeping time, cooking pressure, energy, power, temperature, time, and lime content), it is possible to obtain masa or dehydrated masa (nixtamalized corn flour) suitable for the production of fresh masa or for instant flour.

An important result of the method is that, because no effluent is discarded, the yield is from 8 to 15% higher than that achieved in the traditional and the current instant flour production methods.

These and other objectives and advantages of the present invention will be evident to experts in the field from the detailed description of the invention illustrated as follows.

DETAILED DESCRIPTION OF THE INVENTION

The invention refers to a selective nixtamalization process for the production of fresh whole corn masa, instant corn flour, and their derivatives. In general, with the method of the present invention it is possible to make fresh masa and instant flour for tortilla and derivatives.

The method is based on the selective nixtamalization of the pericarp fraction and the appropriate hydration of the germ and endosperm fractions. The treated fractions of pericarp, germ and endosperm are blended in the appropriate proportions, and then stone milled for masa preparation or dehydrated and milled to make nixtamalized corn flour.

In general the process for the production of fresh whole corn masa, instant corn flour, and their derivatives is carried out as follows:

a) separating the grains into pericarp, germ and endosperm fractions;

b) cooking the pericarp with lime and water at a temperature between about 50° C. to about 300° C.;

c) hydrating the germ and endosperm fractions with water at room temperature or higher for a period between 0 and 12 hours;

d) drying and milling separately the pericarp of step b) and the germ and endosperm of step c); and, e) mixing the milled pericarp, germ and endosperm obtained in step d) for producing fresh masa.

In general the starting materials used in the process are corn pericarp and germ-endosperm fractions, water, and lime. Corn fractions (pericarp, germ and endosperm fractions) can be of any genotype and should be free of impurities and foreign material. These fractions of pericarp, germ and endosperm can be obtained milling or decorticating the whole corn grain (previously hydrated or with its inherent moisture content), or fractions from the corn dry milling or corn wet milling industries.

The processing step of the pericarp (whole or milled pericarp), lime, and water can be done in a cooker-extruder, microwave oven, joule cooking chamber, IR cooke or in a pressurizing chamber, etc. Also, the whole or milled pericarp can be hydrolyzed and hydrated in a vessel in the presence of water and lime at room temperature or at higher temperatures.

The cooking of the pericarp with lime and water with an extruder can be done in any commercial extruder (single or twin-screw extruder; low or high shear type), with temperatures varying from 50° C. to about 300° C. The cooking within a pressurizing chamber can be achieved under a range of pressures between 1 and 100 atmospheres, with time periods between 0 and 30 minutes employing periodical stirring, and temperature ranges between 50° C. and 1 50° C. The microwave oven for pericarp cooking can be a commercial one with power ranging from 500 watts to several Kilowatts, depending on the mass load. The cooking containers inside microwave ovens must stand temperatures from 50 to 120° C., and heating periods of 1 to 60 minutes. Additionally, the hydrolysis and hydration of the pericarp fraction can be done by the use of enzymes as cellulases, amylases glucoamylases or a mixture of them.

The germ-endosperm fractions (whole or milled) are hydrated in the presence of water (optionally, lime can be used) at room temperature or higher, for a period between 0 and 12 hours. Also, in this step of germ and endosperm hydration, a pressurizing chamber can be used. The chamber can be fitted with a device that allows the administration of heat by any vehicle, such as hot water, direct fire, hot vapor, joule heating, infrared radiation, microwave radiation, or any other heating system. Similarly, the pressurizing chamber can use an inert gas in order to increase the pressure and to reduce the cooking time. On the other hand, the hydrolysis and hydration of the pericarp fraction can be done by the use of enzymes as cellulases, amylases, glucoamylases, or a mixture of them.

Lime concentrations may vary from 0 to 3% (w/w) and can be substituted by any other compound causing pericarp hydrolysis and hydration of the germ-endosperm fractions in presence of water. Water concentration can vary from 10 to 70%(w/w) and its temperature from 0° C. to 100° C.

The treated corn fractions (pericarp and germ-endosperm) are milled with a stone, hammer, or disc mill with a characteristic pattern and pattern size. Fresh masa is obtained with a moisture content ranging from 8 to 55% (w/w).

Drying and milling the fresh masa in order to elaborate nixtamalized whole corn flour. No drying if the purpose is to elaborate fresh masa.

The process for the production of fresh whole corn masa or nixtamalized corn flour and derivatives are formed from about 0 to about 10% (w/w) of pericarp fractions, from 0 to about 15 (w/w) germ fractions and from 0 to about 90% (w/w) endosperm fractions.

The present invention is referred to a method that minimizes the crucial steps of the traditional method, so the rheological characteristics and general quality of the traditional tortillas are retained, but such that no fraction of the corn grain is lost, no polluting effluents are generated, and no long steeping times are needed.

In the traditional method, nejayote has to be discarded because of its high lime content, and lime is needed to hydrolyze and hydrate the pericarp and allow the diffusion of water into the grain.

In this process, the hydrolysis and hydration of the pericarp is achieved by subjecting the pericarp to a rapid cooking at high temperatures and separately hydrating the germ-endosperm fractions. Reduction in steeping time is accomplished with high pressures, which speeds diffusion of water into the internal regions of the grain fractions. As in the traditional process, starch granules are not damaged because, when grains are cooked, they are fully immersed in water, so water availability is not a limiting factor for starch granule swelling; in addition, granule swelling takes place inside the grain matrix, helping to protect them. The inclusion of the whole pericarp and whole germ enriches the textures and nutritional quality of the final product. The hydrolysis of the pericarp releases gums, conferring appropriate texture to the masa with equal characteristics as those produced by the traditional process.

Water is added in sufficient quantity to appropriately hydrate and hydrolyze the pericarp, so no water is wasted. The combined action of water, lime, temperature, and pressure produces a cooked pericarp with appropriate characteristics to be milled in stone, hammer or disc mills and blended with the hydrated germ-endosperm fractions. By controlling the cooking parameters (steeping time, cooking pressure, temperature, time, and lime content), it is possible to obtain masa or dehydrated masa (nixtamalized corn flour) suitable for the production of fresh masa or for instant flour. An important result of the process is that, because no effluent is discarded, the yield is from 8 to 15% higher than the yield obtained with the traditional and the current instant flour production processes.

EXAMPLES

The following are some examples of the process which were carried out in the laboratory of CICATA. However, these examples are illustrative and not limiting; they are given to further describe this invention.

Example 1

This example shows the importance of the presence of the nixtamalized pericarp in the rheological quality of masa and tortilla. Whole corn (1 Kg) was cooked in water (3 L) at 80° C. and, lime (1.5% w/w) solution for a 45 min and steeped for a period of 18 hours. The cooking liquor (nejayote) was drained and discarded and 500 grams of the nixtamal (cooked grain) was drained and washed two times with water to remove excess lime, loosing pericarp and germ fractions. Then, the nixtamal was ground with a stone mill into masa. The masa was flattened into thin disks that were cooked on a hot griddle for 30–60 sec on each side to become tortillas. These tortillas showed excellent rheological characteristics, such as puffing and elastic strength.

Example 2

This example describes the process, previously referred for the production of nixtamalized corn flour and tortillas using commercial fractions of pericarp, germ, and endosperm from the corn wet milling industry. The pericarp fraction was ground in a hammer mill and the milled pericarp was steeped with lime (0.8% w/w) and water (18% moisture content). The hydrated and alkalinized pericarp was extruded in a commercial extruder. The temperatures of the barrel were 100° C., and 120° C. at 130 rpm screw speed. The extruded samples were dehydrated and milled in a hammer mill. The germ-endosperm fractions were steeped in water and lime (1% w/w) at 90° C. for 15 minutes. The pericarp fraction was blended with the germ-endosperm fraction and milled in a stone mill to prepare the masa. The fresh masa was dehydrated in a recirculating hot air oven and milled in a hammer mill. The flour was mixed with water until masa was obtained with appropriate consistency (1:1.25 ratio). The masa was flattened into thin disks that were cooked on a hot griddle for 30–60 sec on each side to become tortillas. These tortillas showed excellent rheological characteristics, such as puffing and elastic strength.

Example 3

This example describes the process, previously referred for the production of nixtamalized corn flour and tortillas, using commercial fractions of pericarp, germ, and endosperm from the corn dry milling industry. The pericarp fraction was ground in a hammer mill and the milled pericarp was steeped with lime (0.8% w/w) and water (20% moisture content). The hydrated and alkalinized pericarp was cooked in an experimental infrared chamber at 460° C. during 17 seconds. The germ-endosperm fractions were steeped in water and lime (1% w/w) at 90° C. during 15 minutes. The pericarp fraction blended with the germ and endosperm fraction and milled in a stone mill to prepare the masa. The fresh masa was dehydrated in a recirculating hot air oven and milled in a hammer mill. The nixtamalized flour was then mixed with water (1:1.25 ratio) until a masa was obtained with appropriate consistency. The masa was flattened into thin disks that were cooked on a hot griddle for 30–60 sec on each side to become tortillas. These tortillas showed excellent rheological characteristics, such as puffing and elastic strength, similar to the characteristics of the tortillas made by the traditional process.

Example 4

This example describes the process for obtaining fresh masa and tortillas. Clean whole corn free of foreign material was steeped during 5 minutes in room water and the pericarp was then separated by abrasion and sieving. The pericarp fractions were placed in a vessel with hot water and lime (1% w/w) and then cooked for 6 minutes in a pressurizing chamber heated by an electrical resistor (270° F., 26– 27 psi). Similarly, the germ-endosperm fractions were steeped in water and lime (1% w/w) at 90° C. during 15 minutes. The pericarp fraction and the germ-endosperm fraction were blended and milled in a stone mill to prepare the masa. The masa was flattened into thin disks that were cooked on a hot griddle for 30–60 sec on each side to become tortillas. These showed excellent rheological characteristics, such as puffing and elastic strength, similar to the characteristics of tortillas made with the traditional process.

Example 5

In this example is described an experimental process previously referred, in order to obtain nixtamalized corn flour and tortillas. Clean whole corn free of foreign material, was ground in a disc mill and the milled fractions were separated by sieving. The pericarp fractions were placed in a vessel with hot water and lime (1% w/w) and then cooked for 6 minutes in the pressurizing chamber, heated by an electrical resistor (270° F., 26–27 psi). At the same time, the germ-endosperm fractions were steeped in water and lime (1% w/w) at 90° C. during 15 minutes. The pericarp, germ and endosperm fractions were blended and milled in a stone mill for masa preparation. The masa was dehydrated with hot air. The resulting dehydrated masa was hammer milled and passed through a sieve to yield whole corn flour with a 9% moisture content. The whole corn flour showed an absorption water index of 1.25 (100 grs of flour absorbs 125 ml of water). The resulting nixtamalized whole corn flour was mixed with water to prepare masa. The masa was shaped into flat disks using a manual machine. The disks were cooked on a hot griddle (290° C.±10° C.) for 25 seconds on one side, followed by 35 sec on the opposite side, and turned to the initial side until puffing was achieved. The resulting tortillas showed excellent characteristics of color, flavor, puffing, and texture (rollability).

Example 6

In this example is described the process for obtaining fresh masa and tortillas, using commercial fractions of pericarp, germ, and endosperm from the corn wet milling industry. The pericarp fraction was hammer milled and cooked with lime (0.8% w/w) and water in a commercial microwave oven at full power level of 1000 watts during 20 minutes. On the other hand, the germ-endosperm fractions were cooked with lime (0.25% w/w) and water in a commercial microwave oven at full power of 1000 watts during 2 minutes. The pericarp, germ and endosperm fractions were blended and milled in a stone mill for masa preparation. The masa was shaped in flat discs using a manual machine. The disks were flattened in thin disks and cooked on a hot griddle (290° C.±10° C.) for 25 sec on one side, followed by 35 sec on the opposite side, and turned to the initial side until puffing is achieved. The resulting tortillas showed excellent characteristics of color, flavor, puffing, and texture (rollability).

Thus, the products that can be elaborated from the masa obtained with the process of the present invention comprises the following: Tortilla and derived products with the following options: with and without additives (preservatives, nutrients, hydrants, etc.), from fresh masa or from instant flour.

Notwithstanding the above, reference has been made to various embodiments of the present invention; however it will be evident that experts in the field could make some additional changes, which would be included within the spirit and scope of the invention that is claimed in the following claims:

What is claimed is:

1. A process for the production of fresh whole corn masa and derived products comprising the steps of:
   a) separating corn grains into pericarp, germ and endosperm fractions;
   b) cooking the pericarp fraction with lime and water at a temperature between about 50° C. to about 300° C.;
   c) hydrating the germ and endosperm fractions with water;
   d) milling the pericarp fraction of step b), and the germ and the endosperm fraction of step c) separately; and,
   e) mixing the pericarp, germ and endosperm fractions obtained in step d) to produce fresh corn masa.

2. The process for the production of fresh whole corn masa and derived products as claimed in claim 1 wherein the fresh whole corn masa is dehydrated and milled for producing nixtamalized corn flour.

3. The process for the production of fresh whole corn masa and derived products as claimed in claim 1 wherein the hydrating step is carried out at room temperature or higher for a period between 0 and about 12 hours.

4. The process for the production of fresh whole corn masa and derived products as claimed in claim 1 wherein the lime concentrations are about 0.25 to about 3% (w/w).

5. The process for the production of fresh whole corn masa and derived products as claimed in claim 1 wherein the water concentration is between about 10 to about 70% w/w.

6. The process for the production of fresh whole corn masa and derived products as claimed in claim 1 wherein the cooking step is carried at a pressure between about 0 to about 100 atmospheres.

7. The process for the production of fresh whole corn masa and derived products as claimed in claim 1 wherein the pericarp fractions are ground in a hammer mill.

8. The process for the production of fresh whole corn masa and derived products as claimed in claim 1 wherein the pericarp fraction is hydrated with enzymes selected from the group consisting of cellulases, xylanases, amylases, glucoamylases, or mixtures thereof.

9. The process for the production of fresh whole corn masa and derived products as claimed in claim 1 wherein the fresh whole corn masa is obtained with a moisture content ranging from about 8% w/w to about 55% w/w.

10. The process for the production of fresh whole corn masa and derived products as claimed in claim 1 wherein the pericarp fraction is ground in a hammer mill and the milled pericarp is steeped with lime 0.8% w/w and water 18% moisture content.

11. The process for the production of fresh whole corn masa and derived products as claimed in claim 1 wherein the germ and endosperm fractions are steeped in water and lime at about 1% w/w at 90° C. for at least 15 minutes.

12. The process for the production of fresh whole corn masa and derived products as claimed in claim 1 wherein the pericarp, germ and endosperm fractions are blended and milled in a stone mill for the masa preparation.

13. The process for the production of fresh whole corn masa and derived products as claimed in claim 1 wherein the pericarp fraction is ground in a hammer mill and the milled pericarp is steeped with lime at a concentration of about 0.8% w/w and water with about a 20% moisture content.

14. The process for the production of fresh whole corn masa and derived products as claimed in claim 1 wherein the germ and endosperm fractions are steeped in water and containing 1% w/w of lime at 90° C. by at least 15 minutes.

15. The process for the production of fresh whole corn masa and derived products as claimed in claim 1 wherein the pericarp fraction is placed in a vessel with hot water and lime at a concentration of about 1% w/w and then cooked for six minutes in a pressurizing chamber.

16. The process for the production of fresh whole corn masa and derived products as claimed in claim 1, wherein the germ and endosperm fractions are steeped in water and lime at a concentration of about 1% w/w at 90° C. for least 15 minutes.

17. The process for the production of fresh whole corn masa and derived products as claimed in claim 2 wherein the masa is dehydrated with hot air.

18. The process for the production of fresh whole corn masa and derived products as claimed in claim 2 wherein the dehydrated masa is hammer milled and passed through a sieve to produce whole corn flour with a 9% moisture content.

19. The process for the production of fresh whole corn masa and derived products as claimed in claim 1, wherein the fresh whole corn masa is formed of at most 10% (w/w) of pericarp fraction, of at most 15% (w/w) of germ fraction and of at most 90% (w/w) of endosperm fraction.

20. Process for the production of nixtamalized corn flour and derived products comprising the steps of:
   a) separating corn grains into pericarp, germ and endosperm fractions;
   b) cooking the pericarp fraction with lime and water at a temperature between about 50° C. to about 300° C.;
   c) hydrating the germ and endosperm fractions with water;
   d) drying the pericarp fraction of step b) and the germ and endosperm fractions of step c) separately; and,
   e) mixing the pericarp, germ and endosperm fractions obtained in step d) to produce nixtamalized corn flour.

21. The process for the production of nixtamalized corn flour and derived products as claimed in claim 20 wherein the step of drying comprises the step of milling the pericarp fraction and the germ and endosperm fractions.

22. The process for the production of nixtamalized corn flour and derived products as claimed in claim 20 wherein the hydrating step is carried out at room temperature or higher for a period between 0 and about 12 hours.

23. The process for the production of nixtamalized corn flour and derived products as claimed in claim 20 wherein the lime concentrations are about 0.25% to about 3% (w/w).

24. The process for the production of nixtamalized corn flour and derived products as claimed in claim 20 wherein the water concentration is between about 10% and about 70%(w/w).

25. The process for the production of nixtamalized corn flour and derived products as claimed in claim 20 wherein the cooking step is carried out at a pressure between about 0 to about 100 atmospheres.

26. The process for the production of nixtamalized corn flour and derived products as claimed in claim 20 wherein the pericarp fraction is ground in a hammer mill.

27. The process for the production of nixtamalized corn flour and derived products as claimed in claim 20 wherein the pericarp fraction is hydrated with enzymes selected from the group consisting of cellulases, xylanases, amylases, glucoamylases or mixtures thereof.

28. The process for the production of nixtamalized corn flour and derived products as claimed in claim 20 wherein the pericarp fraction is ground in a hammer mill and the milled pericarp is steeped with lime 0.8% w/w and water 18% moisture content.

29. The process for the production of nixtamalized corn flour and derived products as claimed in claim 20 wherein the germ and endosperm fractions are steeped in water and lime at about 1% w/w at 90° C. for at least 15 minutes.

30. The process for the production of nixtamalized corn flour and derived products as claimed in claim 20 wherein the pericarp, germ and endosperm fractions are blended and milled in a stone mill for the preparation of the nixtamalized corn flour.

31. The process for the production of nixtamalized corn flour and derived products as claimed in claim 20 wherein the pericarp fraction is ground in a hammer mill and the milled pericarp is steeped with lime at a concentration of about 0.8% (w/w) and water with a 20% moisture content.

32. The process for the production of nixtamalized corn flour and derived products as claimed in claim 20 wherein the germ and endosperm fractions are steeped in water and lime at a 1% (w/w) at 90° C. by at least 15 minutes.

33. The process for the production of nixtamalized corn flour and derived products as claimed in claim 20 wherein the pericarp fraction is placed in a vessel with hot water and lime at a concentration of about 1% w/w and then cooked for at least six minutes in a pressurizing chamber.

34. The process for the production of nixtamalized corn flour and derived products as claimed in claim 20 wherein the germ and endosperm fractions are steeped in water and lime at a concentration of about 1% w/w at 90° C. by at least 15 minutes.

35. The process for the production of nixtamalized corn flour and derived products as claimed in claim 20, wherein the nixtamalized corn flour is formed of at most 10% (w/w) of pericarp fraction, of at most 15% (w/w) of germ fraction and of at most 90% (w/w) of endosperm fraction.

* * * * *